United States Patent
Calvanese Strinati

(10) Patent No.: US 9,097,605 B2
(45) Date of Patent: Aug. 4, 2015

(54) LOCATION OF A LEAK IN A PIPE

(71) Applicant: Commissariat a l'Energie Atomique et aux Energies Alternatives, Paris (FR)

(72) Inventor: Emilio Calvanese Strinati, Grenoble (FR)

(73) Assignee: Commissariat à L'énergie Atomique et aux énergies Alternatives (FR)

( * ) Notice: Subject to any disclaimer, the term of this patent is extended or adjusted under 35 U.S.C. 154(b) by 0 days.

(21) Appl. No.: 13/929,499

(22) Filed: Jun. 27, 2013

(65) Prior Publication Data

US 2014/0000348 A1 Jan. 2, 2014

(30) Foreign Application Priority Data

Jun. 28, 2012 (FR) .................................... 12 56152

(51) Int. Cl.

| | |
|---|---|
| *G01M 3/26* | (2006.01) |
| *G01M 3/28* | (2006.01) |
| *G01M 3/18* | (2006.01) |
| *G01M 3/00* | (2006.01) |
| *E21B 47/10* | (2012.01) |
| *G01M 3/24* | (2006.01) |
| *G01M 3/04* | (2006.01) |

(Continued)

(52) U.S. Cl.
CPC ................. *G01M 3/18* (2013.01); *E21B 47/10* (2013.01); *E21B 47/101* (2013.01); *E21B 47/1025* (2013.01); *G01M 3/00* (2013.01); *G01M 3/005* (2013.01); *G01M 3/04* (2013.01); *G01M 3/24* (2013.01); *G01M 3/2815* (2013.01); *G01M 3/2823* (2013.01); *G01M 3/40* (2013.01); *G01S 13/90* (2013.01)

(58) Field of Classification Search
CPC ... E21B 47/1025; G01M 3/2853; G01M 3/00; G01M 3/28; G01M 3/22; G01M 3/246; G01M 3/2823
USPC ....................................................... 73/40–49.8
See application file for complete search history.

(56) References Cited

U.S. PATENT DOCUMENTS

| | | | |
|---|---|---|---|
| 5,117,676 A | * | 6/1992 | Chang .......................... 73/40.5 A |
| 5,805,098 A | | 9/1998 | McCorkle |
| 7,119,732 B1 | * | 10/2006 | Lam et al. ........................ 342/27 |

(Continued)

FOREIGN PATENT DOCUMENTS

| | | |
|---|---|---|
| EP | 1193470 A2 | 4/2002 |
| EP | 2352002 A1 | 8/2011 |

OTHER PUBLICATIONS

Imad Jawhar, et al, "A Framework for Pipeline Infrastucture Monitoring Using Wireless Sensor Networks", 2007, pp. 17, Publisher: College of Information Technology United Arab Emirates University, Published in: AE.

(Continued)

*Primary Examiner* — Eric S McCall
*Assistant Examiner* — Anthony W Megna Fuentes
(74) *Attorney, Agent, or Firm* — Kaplan Breyer Schwarz & Ottesen, LLP

(57) ABSTRACT

A method and a device including the steps of: locally detecting an event in a pipe; generating at least one signal, coded according to the detected event; and detecting a frequency signature of said signal in images generated by a synthetic aperture radar.

11 Claims, 3 Drawing Sheets

(51) Int. Cl.
*G01M 3/40* (2006.01)
*G01S 13/90* (2006.01)

(56) References Cited

U.S. PATENT DOCUMENTS 7,830,273 B2 * 11/2010 Twitchell, Jr. ............ 340/870.07
2010/0064775 A1 * 3/2010 Ben-Mansour ............ 73/40.5 A

OTHER PUBLICATIONS

Charles Jeffs, et al, "An Introduction to Water Loss and Leak Detection", "Rural and Small Water Systems Training Guide", 1989, Publisher: National Rural Water Association, Published in: US.

Younghun Kim, et al, "NAWMS: Nonintrusive Autonomous Water Monitoring System", Nov. 05, 2008, Publisher: University of California Electrical Engineering Department, Published in: US.

Nader Mohamed, et al, "A Fault Tolerant Wired/Wireless Sensor Network Architecture for Monitoring Pipeline Infrastructures", "The Second International Conference on Sensor Technologies and Applications", 2008, Publisher: IEEE Computer Society, Published in: AE.

Frank Murphy, et al, "Development of a Wireless Sensor Network for Collaborative Agents to Treat Scale Formation in Oil Pipes", "Development of a WSN for Collaborative Agents", 2007, pp. 179-194, Publisher: Springer-Verlag Berlin Heidelberg, Published in: IE.

Hong-Gyoo Sohn, et al, "Detecting Water Area During Flood Event from SAR Image", 2005, pp. 771-780, Publisher: Springer-Verlag Berlin Heidelberg, Published in: KR.

Ivan Stoianov, et al, "PIPENET: A Wireless Sensor Network for Pipeline Monitoring", Apr. 25, 2007, Publisher: ACM, Published in: US.

Davide Reto, "Related French Patent Application No: FR 1256152 Search Report", May 3, 2013, Publisher: inpi, Published in: FR.

* cited by examiner

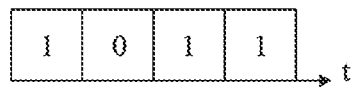
Fig 6A                    Fig 6B
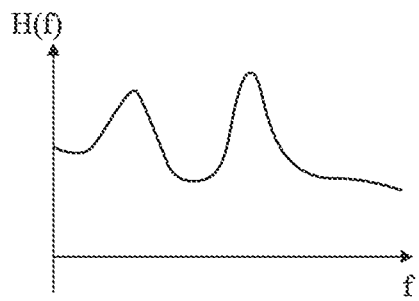
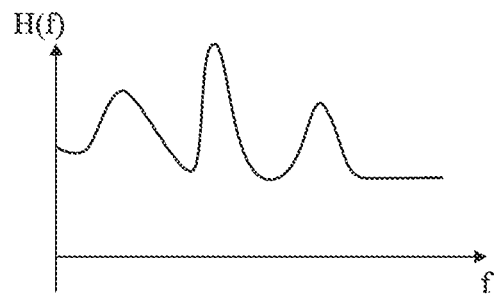
Fig 7A                    Fig 7B
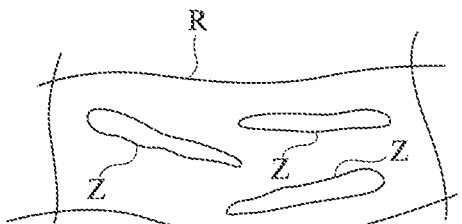
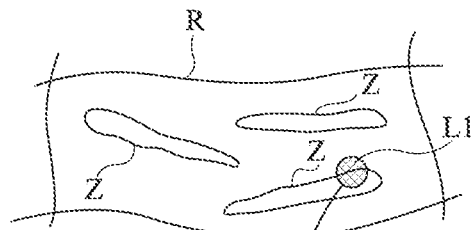
Fig 8A                    Fig 8B
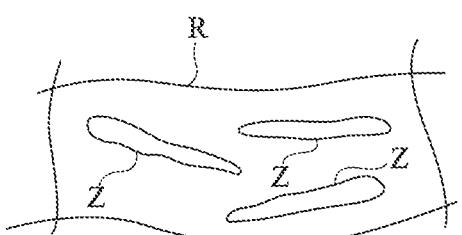
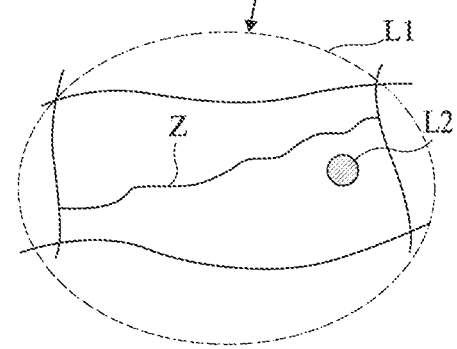
Fig 9A                    Fig 9B
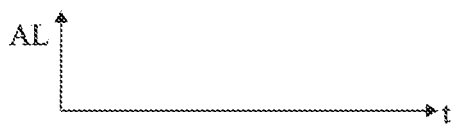
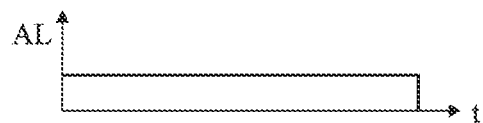
Fig 10A                   Fig 10B

LOCATION OF A LEAK IN A PIPE

BACKGROUND

The present disclosure generally relates to the detection of an event in a pipe and, more specifically, to the detection and the location of a leak of a fluid flowing in a buried pipe or of another event affecting the pipe.

DISCUSSION OF THE RELATED ART

The detecting and the locating of a leak in a pipe are recurring issues for which many solutions have already been provided, be it for water pipes, gas pipes, or oil pipes.

While it is relatively easy to find out that a pipe has a leak between two points by detecting a loss of flow at the end point, locating this leak is often more difficult. Further, locating a leak is all the more difficult as the pipe is deeply buried. Further, the position of the pipes is often unknown by the operator of a pipe network.

Among existing techniques for detecting a leak in a pipe, one can mention:

sensors placed at regular intervals along the pipe to analyze the pressure variation, for example, by using acoustic waves, correlation systems; and swimming sensors which circulate in the pipe and which detect pressure variations.

To locate the leak, the information provided by such sensors then has to be transmitted.

In the first case (sensors placed at regular intervals), the simplest technique comprises having a data transmission cable circulate along the pipe. This technique is particularly expensive. It has already been provided to use radio waves, for example, by equipping sensors with an electro-magnetic transponder like an RFID tag. However, the range of such a system does not exceed a few meters and is not applicable to deep pipes.

An additional difficulty in the presence of buried pipes is that the pipe mapping is often inaccurate. This is not really an issue in the case of urban distribution pipes due to the high density of such pipes. However, for transport pipes of such a network which convey the fluid over tens, or even hundreds of kilometers at a great depth, this becomes a problem.

Further, in an application to a drinking water transport network, it is not only important to detect and locate the leak to be able to repair it, but also useful to know whether this leak generates a contamination, for example, bacteriological, of the water flowing therethrough. Indeed, if this happens, the water distribution must be interrupted for sanitary reasons while, otherwise, the leak is only a nuisance because water is lost, but is not necessarily dangerous.

This problem also exists in the case of a hydrocarbon or gas transport, for example, to detect an infiltration of water into a hydrocarbon or to be sure of the purity of the transported fluid.

SUMMARY

An embodiment enables to locate an event in a pipe, for example, a leak in a pipe.

Another embodiment provides a solution which applies whatever the depth at which the pipe is buried.

Another embodiment provides a solution requiring no modification of existing leak detectors.

Another embodiment provides a solution compatible with a transmission of more information than the mere existence of a leak such as, for example, the presence of foreign bodies in the transported fluid, a contamination of this fluid, the nature or the size of the leak, etc.

Another embodiment provides a solution compatible with existing detectors for detecting such additional information.

An embodiment provides a method comprising the steps of:

locally detecting an event in a pipe;

generating at least one signal, coded according to the detected event; and detecting a frequency signature of said signal in images generated by a synthetic aperture radar.

According to an embodiment, said event is detected by swimming sensors or detectors placed along the pipe, preferably at regular intervals.

According to an embodiment, said event is a leak.

According to an embodiment, the signal coding is a function of one or several parameters, among which the presence of a leak, the size of the leak, the presence of a contaminant, a malfunction of the detector, an identifier of the detector.

According to an embodiment, the coded signal is variable along time and successively takes values corresponding to said parameters.

According to an embodiment, in the case where an event is detected in a first passage of the radar, the latter is configured to increase its resolution in the region of the event for a subsequent passage.

According to an embodiment, in the case where an event is detected during the passage of a first radar, said location is refined during at least one passage of a second radar of different resolution.

Another embodiment provides a system comprising:

at least one detector of an event in a pipe;

at least one device capable of generating at least one signal coded according to the detected event; and at least one synthetic aperture radar for detecting a frequency signature of said signal.

According to an embodiment, the system further comprises at least one computer system for processing data provided by the radar.

According to an embodiment, the detector is connected to the device.

According to an embodiment, the pipe is buried.

According to an embodiment, the device is positioned according to the range of the radar.

According to an embodiment, the system further comprises at least one detector of the presence of a contaminant or foreign body in the pipe.

A device for generating a signal adapted to such a system is also provided.

According to an embodiment, the system comprises: an actuator circuit controlled by the detector; and a circuit for transmitting a coded signal under control of the actuator.

The foregoing and other features and advantages will be discussed in detail in the following non-limiting description of specific embodiments in connection with the accompanying drawings.

BRIEF DESCRIPTION OF THE DRAWINGS

FIGS. 6A and 6B, 7A and 7B, 8A and 8B, 9A and 9B, 10A and 10B, illustrate the operation of the system of FIG. 1, respectively in the absence and in the presence of a leak.

DETAILED DESCRIPTION

Figure 1:
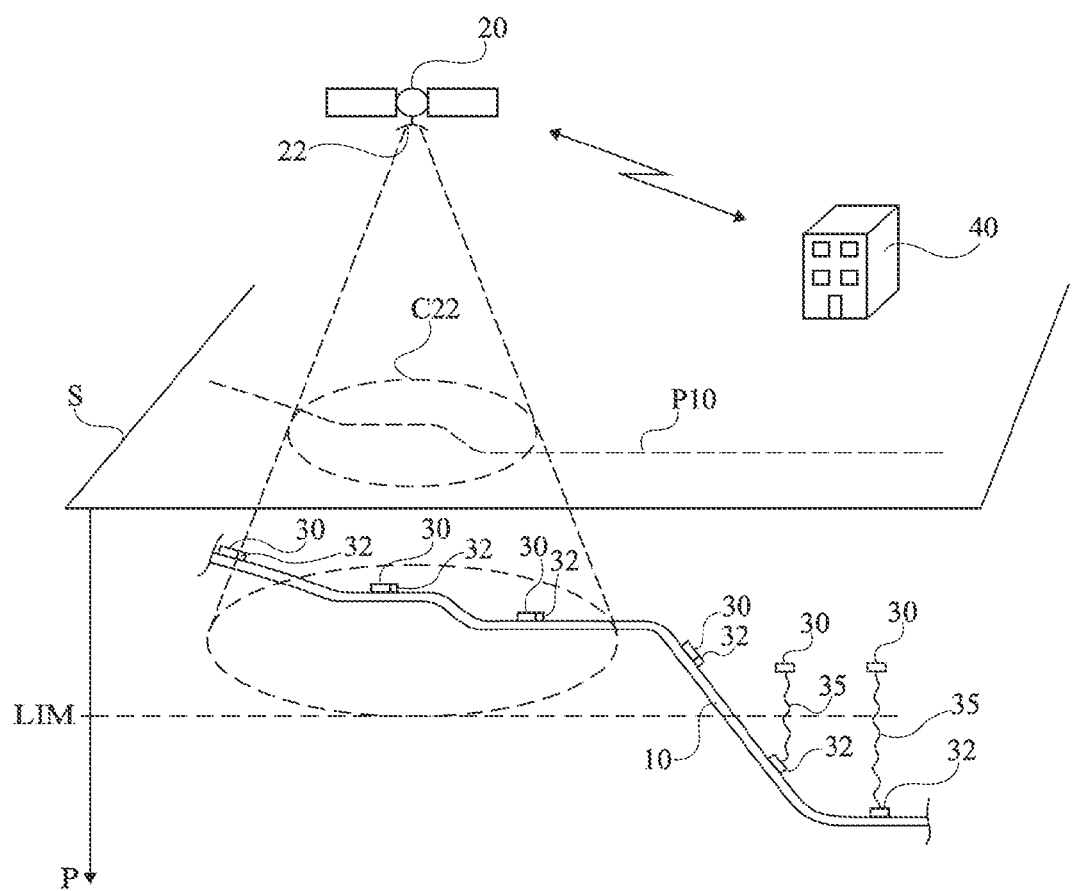
FIG. 1 is a very simplified representation of an embodiment of a system for locating a leak in a pipe.

The same elements have been designated with the same reference numerals in the different drawings, which have been drawn out of scale. Further, only those steps and elements which are useful to the understanding of the embodiments which will be described have been shown and will be detailed. In particular, the leak detectors, be the detection performed by pressure analysis, by the use of acoustic waves, etc., have not been detailed, the described embodiments being compatible with current detectors, be they simple leak detectors or more advanced detectors also detecting the presence of a contaminant or any other event detector. Similarly, what exploitation is made of the received information has not been detailed, the described embodiments being, here again, compatible with the current use of data relative to leaks in pipes.

An embodiment will be described hereafter in relation with an example of leak location, but the present description more generally applies to the locating of any event relative to a pipe or to a fluid that it transports, provided for said event to be locally detectable. Similarly, the present disclosure will focus on the example of a buried pipe, knowing that the present invention applies to any pipe, be it directly in the ground, in free air, in a tunnel, an underground duct, etc., and whatever the size of the pipe network possibly containing this pipe.

It is provided to use a synthetic aperture radar (SAR).

Such a radar is well known per se. The radar antenna is generally attached to a satellite or to a plane and generally has an azimuthal aperture of several degrees in the displacement direction and laterally. The radar emits radio wave pulses at wavelengths ranging from a few meters to a few millimeters. Since the radar moves, the same area or the same point is illuminated several times. A series of data is thus obtained for each area of point under the radar. The echoes received at the different positions of the antenna are combined to obtain images of the observed areas as if a wide antenna of very high resolution was used. By point-by-point analysis of the Fourier transforms and of the phase differences between the images, a SAR radar enables not only to obtain a relief mapping of the ground, but also information relative to the nature of the encountered elements. Indeed, according to their composition, these elements have different frequency responses or signatures. The consistency of the observed areas not only depends on the image acquisition geometry, but also on the nature of the area. It is thus possible, by processing of the obtained images, to locate areas of different natures.

The use of a SAR-type radar has the advantage of covering significant areas as well as areas of difficult access.

They further enable to detect events under the earth's surface. The detection depth, which may reach several tens of meters, depends on the radar resolution and on the nature of the ground.

It could have been devised to exploit images of a SAR radar to detect sheets of water or of a fluid around a pipe and to deduce therefrom the possible existence of a leak. Indeed, SAR radars have already been used to detect the presence of ground water sheets. However, it would for this purpose be necessary to exactly know the pipe mapping, which is not the case. Further, the detection would be disturbed by any presence of a sheet of fluid between the ground and the pipe. It would further be impossible to distinguish the presence of a natural sheet from a leak.

It is however provided to take advantage of the ability of SAR radars to provide signals usable to generate mappings of frequency responses of the overflown areas to locate leak detectors placed along a pipe. To achieve this, circuits for generating a determined signal, actuated in the presence of a leak, are associated with these detectors. In other words, while a SAR radar generally interprets passive signatures of the ground or of the depths, it is used to transmit information transmitted by a device to an interpretation and processing center. The processing center receives the images generated by the radar and processes these images to reconstruct a mapping of the area. Such a mapping will be modified in the case where a code or pattern is transmitted by one of the devices associated with the detectors.

FIG. 1 very schematically shows an embodiment of a system for detecting and locating a leak in a buried pipe 10. This drawing shows a geographic area comprising pipe 10 and overflown by a SAR radar (symbolized by its antenna 22) supported by a satellite 20 or, as a variation, by a plane not shown. Pipe 10 follows any path on the ground. The path is symbolized by dotted lines P10 in FIG. 1.

Pipe 10 is equipped with detectors 32 and devices 30 for coding and transmitting information provided by the detectors.

The cone of radar 22 illuminates an area (dotted line C22) on the ground which moves along with satellite 20. In depth P, the rays encounter the different ground components as well as pipe 10. In the idle state, that is, when there is no leak, the devices are for example at stand-by and transmit nothing. When a device 30 is activated by the detector associated therewith, it starts transmitting a signal, preferably repetitive, periodic or not, which will modify the frequency signature of the area where this device is located. The mapping of this area will thus be modified in the presence of a leak. The interpretation of this mapping enables not only to detect the leak, but also to locate the detector which has reported it. The images of the SAR radar are processed by a ground center 40, equipped with the computer systems necessary to reconstruct the mapping.

According to the depth of pipe 10, devices 30 may be combined with the detectors (left-hand portion of FIG. 1) or be placed closer to the surface (right-hand portion of FIG. 1) to be within the range of the SAR radars. In this last case, they are connected to the detectors by wire or wireless links (radio or acoustic waves, for example).

Figure 2:
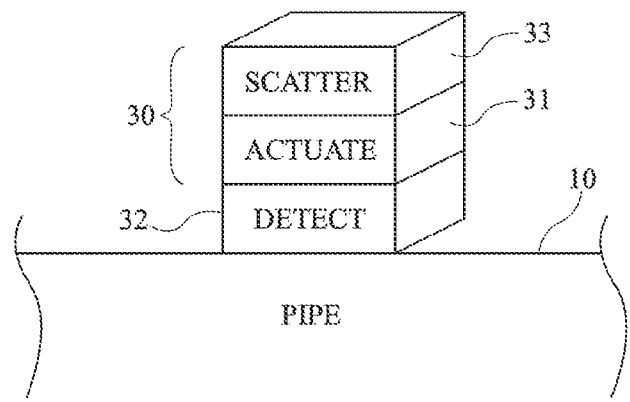
FIG. 2 is a very simplified representation of an embodiment of a transmit device of the system of FIG. 1.

FIG. 2 very schematically shows in the form of blocks elements of the system placed on the side of pipe 10 (PIPE). Detector 32 (DETECT) is placed against pipe 10 to analyze, for example, with acoustic waves, but more generally by any usual leak detection technique, the fluid flowing through the pipe and to detect a possible leak. Device 30 comprises an actuator 31 (ACTUATE), or coder, activated by detector 32, and a circuit 33 for scattering (SCATTER) or for transmitting a signal comprising the determined code or pattern, which is a function of the information to be transmitted. It is not necessary to transmit with a high power. What matters is for the generation of the pattern to disturb the frequency response of the area in a way which is detectable by the SAR radar.

The signal is transmitted, for example, by an antenna or an active or passive network of antennas which generates a spectral fingerprint or signature in the area of device 30. The signal is coded according to the event.

According to embodiments, it may be provided for all three elements 31, 32, and 33 to be comprised within a same element, for example, a device attached to the pipe, or for them to be separate.

Figure 3:
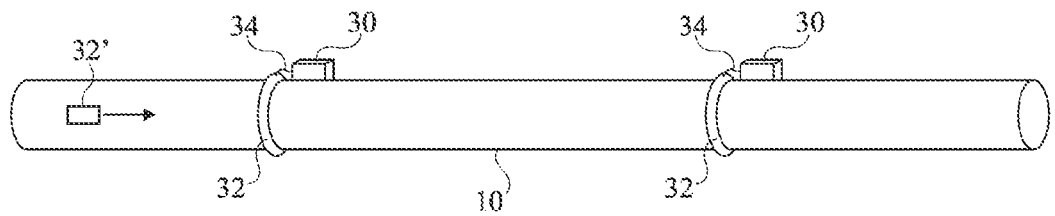
FIGS. 3, 4, and 5 illustrate embodiments of transmit devices.

FIG. 3 shows an embodiment of a section of pipe 10. The leak detector is formed of a swimming sensor 32' circulating along with the fluid in pipe 10 and transmitting information to detectors 32, generally ring-shaped, distributed along the pipe. The assembly of swimming sensor 32' and of detector 32 forms a usual detection device. Detector 32 communicates with a device 30 (coder 31 and emitter 33), in the shown example, via a wire link 34. Any other type of link can be envisaged.

Figure 4:
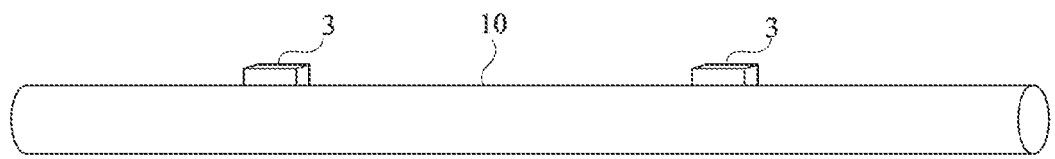

FIG. 4 shows a section of pipe 10 according to another embodiment of the type in FIG. 2 where detector 32 and device 30 are comprised within a same device 3.

Figure 5:
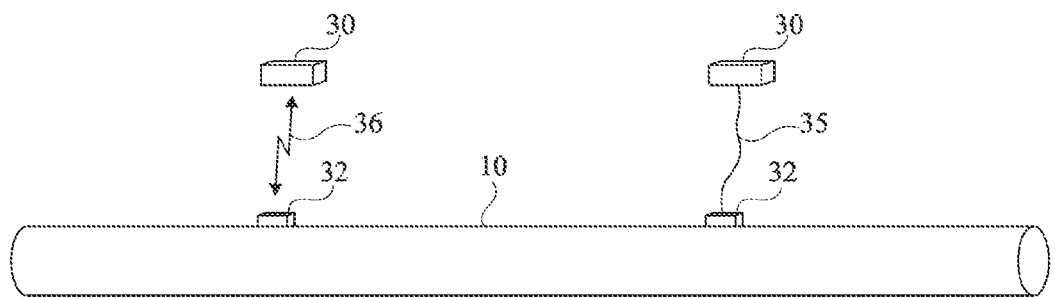

FIG. 5 shows a section of pipe 10 according to still another embodiment, more specifically intended for the case where pipe 10 is buried at a depth greater than the detection limit of the SAR radar. It is then provided to bury device 30 (or at least transmit circuit 33) at a depth within the range of the radar, smaller than that of the pipe. The detector (or an element comprising detector 32 and circuit 31) is for example buried with the pipe and communicates, with distant device 30 (or circuit 33), by means of a wire link 35 or a wireless link 36. The limiting depth (LIM, FIG. 1) depends on the radar power, on the nature of the field, on the number of radar passages, on the image resolution, and even on the pattern transmitted by device 30 which may be more or less easily detected by the radar. Such a limiting depth may thus vary along the pipe. It may for example be determined on laying of the pipe by exploiting a test passage of the radar. SAR radars which are capable of detecting signatures down to a depth of several tens of meters are now available.

The different embodiments of the device on the pipe side may be combined and different embodiments may be present along a same pipe, for example, according to the depth of the pipe.

The power supply of circuits 31 and 33, as well as of the detector, may originate from batteries integrated to these circuits or from devices extracting power from the actual flow (water turbines, for example). A pattern or code consuming little power will preferably be selected.

FIGS. 6 to 10 illustrate the operation of the system of FIG. 1. FIGS. 6A, 7A, 8A, 9A, and 10A illustrate the operation in the absence of a leak. FIGS. 6B, 7B, 8B, 9B, and 10B illustrate the operation in the presence of a leak.

Device 30 is assumed to be idle in the absence of a leak (FIG. 6A). No signal is transmitted. The frequency response (FIG. 7A) of region R illuminated by the radar then corresponds to a response in the idle state. The image reconstruction (FIG. 8A) provides no information other than the information generally captured by the radar. Areas Z having different frequency responses have been arbitrarily shown in FIG. 8A. These for example are different reliefs or different ground natures.

As a variation, a signal is transmitted even in the idle state, for example, to confirm the proper operation of the buried device, this being however performed at the cost of an increased consumption.

In the presence of a leak, circuit 31 generates a code signaling or identifying this leak (FIG. 6B). The code may be of variable complexity according to the information to be transmitted. The transmission frames of this code are preferably periodic. The frame length depends, among others, on the code pattern to be transmitted. The frame may comprise a preamble containing an identifier of the detector to enable to identify its type, or even its serial number. The code may also contain, for example, in successive frames or packets, different data such as, for example, the indication of a leak followed by a characterization of this leak. In the arbitrarily-chosen example of FIG. 6B, the case of a code over 4 bits is assumed.

Such a transmission, once transformed by circuit 33, modifies the frequency spectrum H(f) of the response of the detector area (FIG. 7B). In region R illuminated by the radar, this area is detectable. Such a detection may be performed by comparing the image with a reference image in the absence of a leak. Preferably, to avoid using a reference image, the existence in the image of frequency lines characteristic of the transmitted pattern is rather detected.

According to the radar resolution, this determination may or not be used for the location. If this resolution is not sufficient, which would be true in most situations to simplify the processing of a majority of images, when an area L1 containing a leak is identified, it increases its resolution by focusing on this area L1 (FIG. 9B). After this second passage, the images generated by the radar enable to refine the position and to locate a more specific area L2. The detection may be further refined by increasing the resolution in subsequent passages of the radar. It may also be provided to exploit the images originating from several radars, for example, the passage of a radar supported by a satellite, followed by that of a radar supported by a plane or another satellite with a more accurate resolution.

The image processing results, in the presence of a leak, in a specific processing, for example, the activation of an alert signal AL (FIG. 10B) at the level of the processing center.

As illustrated in FIGS. 9A and 10A, in the absence of a leak, no zoom is performed on region R (FIG. 9A) and no alert is generated (FIG. 10A).

The scattering code or pattern is preferably selected so that the frequency signature that it represents on the response of the area has a low probability of being under the effect of another modification of the environment. This makes the image interpretation easier. However, since the signature transmitted in case of a leak is transmitted periodically and can even vary along time to be different when the radar makes a second passage by focusing on a smaller area after a leak has been located in a wide area, the risk of a misinterpretation is low with an appropriate image processing. Indeed, the disturbing signature should not only be identical to the transmitted signature, but also be still and, further, in the case where the transmitted signature is modified, it should be modified in the same way.

The information capable of being used for a scattering pattern may comprise the presence of a leak, the size of the leak, the presence of a contaminant, a malfunction of the detector, etc. This pattern may further comprise an identifier of the detector, for example, to ease the location or to give the detector type. The transmission of an identifier of the detector may, according to an alternative embodiment, enable to have a same device 30 (or at least a same circuit 33) shared between several detectors 32. In such a case, radar 22 locates device 30 and the detector identifier enables to refine the location, provided that the identifiers have been stored in relation with their positions with respect to device 30. For example, in the case of three detectors 32 sharing a same device 30, the detectors having their position stored are the upstream detector, the downstream detector, and the associated intermediate detector or the detector vertically in line with device 30.

The implementation of the system requires implanting devices 30 on pipes. Such an implantation may be performed on laying of the pipe or in maintenance operations on all or part of the pipe.

The described embodiments are particularly adapted to pipe networks in low urbanization areas. Indeed, this simplifies the image processing by minimizing the risk of seeing elements (for example, vehicles) disturb the frequency response with a signature close to the transmitted codes. This however does not exclude an implementation in distribution networks in more urbanized areas.

A preferred application is leak detection in water transport networks, for example, in desert areas, where the detection is generally difficult due to the size of the network. The homogeneity of the ground eases the image interpretation.

An advantage of the described embodiments is that it is not necessary to know in advance the mapping of the equipped pipes.

Another advantage is that it is not necessary to modify the SAR radar. Indeed, it is sufficient to interpret the images that it provides. Accordingly, the implementation of the described embodiments may exploit images provided by existing SAR radars.

Another advantage is that it is possible to code different data and, thus, to transmit data giving information other than the simple presence of a leak. Information relative to the size of the leak, the presence of a contaminant and, more generally, any information detected by a detector, may be transmitted.

Various embodiments have been described. Various alterations, modifications, and improvements will occur to those skilled in the art. In particular, the selection of the scattering codes or patterns depends, among others, on the number of different pieces of information which is desired to be transmitted. Further, the time period for which the patterns are transmitted may also vary and depend, for example, on the fact that the transmitted information may be refined during a second passage of the SAR radar.

Further, the practical implementation of the described embodiments is within the abilities of those skilled in the art based on the functional indications given hereabove and by using usual leak detectors and SAR radars and by adapting electronic circuits and computer systems usual per se. In particular, the processing of the images provided by a SAR radar is a technique which is now well controlled. It should finally be noted that it can be sufficient to exploit the characterization of the event without the location (for example, if the position of the pipe and of the detectors is known). In such a case, the information characterizing the event as well as, preferentially, the detector identification, are sufficient. Although, in practice, the images provided by the radar locate the area with a variable accuracy, this can enable to use images with a rougher resolution.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method comprising the steps of:
   locally detecting an event in a pipe with one or more swimming sensors or detectors;
   generating at least one signal with at least one device, coded according to the detected event;
   receiving said at least one signal with a synthetic aperture radar; and
   detecting a frequency signature of said signal in images generated in response to said at least one signal received by said synthetic aperture radar;
   wherein in a case where an event is detected in a first passage of the radar, the latter is configured to increase its resolution in a region of the event for a subsequent passage.

2. The method of claim 1, further comprising the step of placing the one or more swimming sensors or detectors along the pipe at regular intervals.

3. The method of claim 1, wherein said event is a leak.

4. The method of claim 1, wherein the signal coding is a function of one or several parameters comprising a presence of a leak, a size of the leak, a presence of a contaminant, a malfunction of the detector, an identifier of the detector.

5. The method of claim 4, wherein the coded signal is variable along time and successively takes values corresponding to said parameters.

6. A method comprising the steps of:
   locally detecting an event in a pipe with one or more swimming sensors or detectors;
   generating at least one signal with at least one device, coded according to the detected event;
   receiving said at least one signal with a synthetic aperture radar; and
   detecting a frequency signature of said signal in images generated in response to said at least one signal received by said synthetic aperture radar;
   wherein in a case where an event is detected at a location with a passage of a first radar, said location is refined during at least one passage of a second radar of different resolution.

7. A system comprising:
   at least one detector of an event in a pipe;
   at least one device capable of generating at least one signal coded according to a detected event; and
   at least one synthetic aperture radar to detect a frequency signature of said signal
   wherein the at least one device is positioned according to a range of the radar.

8. The system of claim 7, further comprising at least one computer system for processing data provided by the radar.

9. The system of claim 7, wherein the detector is connected to the device.

10. The system of claim 7, wherein the pipe is buried.

11. The system of claim 7, further comprising at least one detector to detect the presence of a contaminant or foreign body in the pipe.

* * * * *